United States Patent
Holmes

[11] 3,879,090
[45] Apr. 22, 1975

[54] HYDRAULIC SKID CONTROL VALVE

[75] Inventor: Lloyd H. Holmes, Salt Lake City, Utah

[73] Assignee: E-Systems, Incorporated, Dallas, Tex.

[22] Filed: Feb. 13, 1974

[21] Appl. No.: 442,171

[52] U.S. Cl. .................... 303/21 F; 303/61
[51] Int. Cl. ............................... B60t 8/06
[58] Field of Search....188/181 A; 303/21 CG, 21 F, 303/61, 10, 13

[56] References Cited
UNITED STATES PATENTS

| | | | |
|---|---|---|---|
| 3,514,161 | 5/1970 | Frayer | 303/21 F |
| 3,666,328 | 5/1972 | Williams | 303/21 F |
| 3,682,513 | 8/1972 | Oberthur | 303/61 X |
| 3,702,713 | 11/1972 | Oberthur | 303/21 F |

*Primary Examiner*—Duane A. Reger
*Attorney, Agent, or Firm*—Richards, Harris & Medlock

[57] ABSTRACT

Velocity sensors at the rear wheels of a vehicle respond to a change in wheel velocity in excess of a maximum allowable change to energize a solenoid to activate a skid control valve to cyclically relieve brake pressure to wheel brake actuators of one axle. The skid control valve is part of a hydraulic brake system including a master cylinder, a cycling pump, and a return reservoir. Pressurized fluid from the master cylinder flows into the skid control valve around a ball stop valve and through a brake port to hydraulic actuators at the brake of one axle. The cycling pump provides pressurized fluid to the skid control valve to bias the ball stop valve into an open position and also to bias a piston into a normal brake position. Fluid pressure supplied by the cycling pump is normally at a higher pressure than that supplied by the master cylinder to the skid control valve. When the solenoid on the skid control valve is actuated, a return port is opened from the cycling pump to the return reservoir. This allows the piston to oscillate between a normal brake position and a skid control position of the master cylinder pressure. Also, the ball valve is closed thereby blocking off any increase of master cylinder pressure to the hydraulic actuators of the brake mechanisms. The brake controller cyclically energizes the solenoid to apply cyclic pressure from the master cylinder to the wheel brake mechanisms of one axle.

22 Claims, 9 Drawing Figures

3,879,090

FLOW vs PRESSURE

HYDRAULIC SKID CONTROL VALVE

This invention relates to skid control apparatus, and more particularly to a hydraulic skid control valve for cyclically applying pressure to a brake system upon sensing of a potential skid condition.

It has long been recognized that if a vehicle entering a skid has the brakes cyclically applied there is a significantly improved chance of maintaining control of the vehicle. For many years the recommendation to the motoring public and professional drivers is that if their vehicle enters a skid the brakes should be "pumped" to improve chances of maintaining control of the vehicle. This "pumping" action is intended to provide a cyclic application of fluid pressure to the individual wheel brake actuators. The more skilled professional driver, after becoming familiar with the peculiarities of his vehicle, was able to significantly reduce the chances of an out of control skid. For the motoring public in general and professional drivers not accustomed to a particular vehicle, the pumping procedure often produced an aggravated skid condition resulting in a complete loss of vehicle control.

A feature of the present invention is to relieve a vehicle operator of the responsibility of properly applying cyclic pressure to a vehicle brake system in a skid condition. Upon sensing a skid condition, a hydraulic skid control valve interconnected between the master cylinder of the vehicle and the individual wheel brake actuators is cyclically operated to produce a pumping action application of fluid pressure to individual wheel brake actuators. The cyclic pressure is applied to the wheel brake actuators for an axle so long as the vehicle operator is actuating the master cylinder or until the skid condition has been corrected.

Another feature of the present invention is to provide a skid control valve that produces a near normal operation of the master cylinder. Thus, the vehicle operator feels only normal brake operation. When a skid condition is detected and the skid control valve is actuated a ball valve within the skid control valve closes against a valve seat to block fluid pressure from the master cylinder through the valve. This maintains pressure at the master cylinder and a retarding force on the brake pedal that produces a normal feel to the operator. Should the operator completely relieve the pressure at the master cylinder, the ball valve opens and the cyclic operation of the control valve solenoid is stopped in its normal operation.

In accordance with one embodiment of the invention, a hydraulic skid control valve in a brake system that includes a primary fluid source and a secondary fluid source comprises a housing having a changeover cavity with a flow channel in communication with a primary flow channel connected to the primary fluid source, the changeover cavity further includes a flow channel to a return channel connected to the secondary fluid source. A valve in the primary flow channel controls the flow of fluid from the primary fluid source to a valve output channel. An oscillator valve in the return channel alternately connects and disconnects the changeover cavity to the secondary fluid source. A pressure responsive actuator in the changeover cavity responds to the secondary fluid source to cyclically transmit a fluid pressure to the valve output channel.

In accordance with a more specific embodiment of the invention, the oscillator valve is solenoid controlled in accordance with a cyclic energizing voltage to cyclically control the pressure responsive actuator to generate a cyclic pressure at the valve output channel.

A more complete understanding of the invention and its advantages will be apparent from the specification and claims and from the accompanying drawings illustrative of the invention.

Referring to the drawings.

Figure 1:
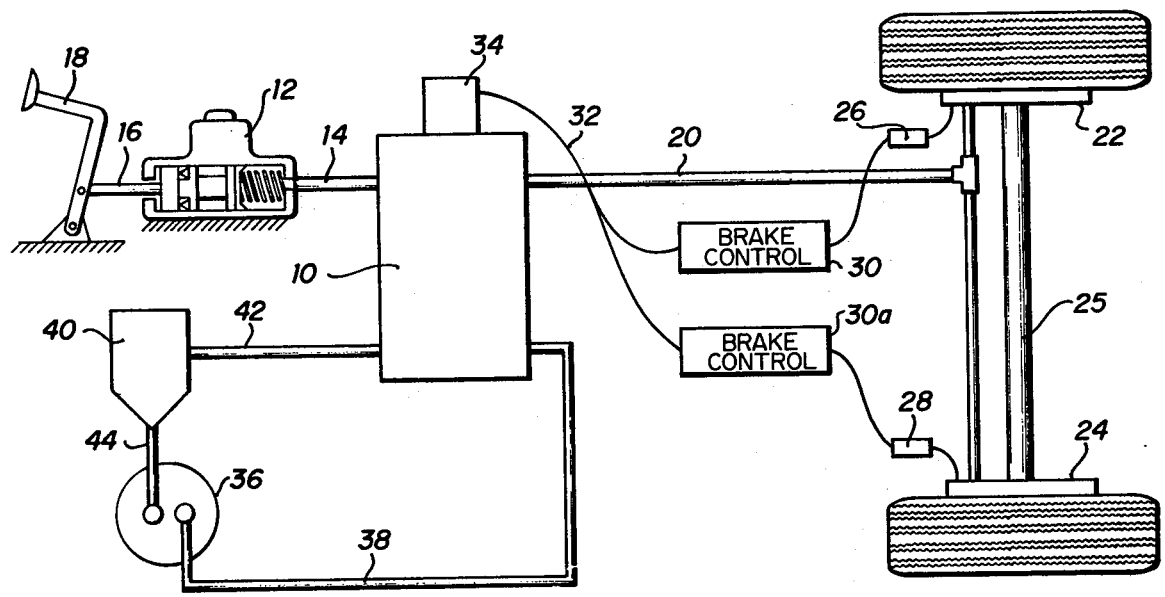
FIG. 1 is a schematic diagram of a hydraulic brake control system utilizing a skid control valve of the present invention.

Referring to FIG. 1, there is shown schematically a brake control system including a skid control valve 10 having a port connected to a master cylinder 12 by means of a conduit 14. Typically, the master cylinder 12 is of the type usually found in vehicles to develop a hydraulic pressure in the conduit 14 in response to a mechanical force developed on a rod 16 that is pivotally connected to a brake pedal 18.

In normal operation of the skid control valve 10, hydraulic fluid under pressure in the conduit 14 passes through the valve into a conduit 20 terminating at individual wheel brake actuators, such as at the wheels 22 and 24 for the axle 25. The individual brake actuators of the wheels 22 and 24 are of a conventional design wherein hydraulic pressure applied to the actuator expands brake shoes in contact with a brake drum for braking action of a vehicle.

Coupled to each of the wheels 22 and 24 are sensors 26 and 28, respectively, each generating an electrical output signal representative of the velocity of the respective wheel. Signals from the sensors 26 and 28 are coupled as inputs to individual brake controllers 30 and 30a that respond to a predetermined voltage at each or both of the sensors to generate a skid control voltage on a line 32 coupled to a secondary controller, for example a solenoid 34 of the skid valve 10. The sensors 26 and 28 and the brake controllers 30 and 30a may be of the type manufactured and supplied by Rockwell International. This three element system is designed to respond to a velocity change at the wheels 22 and 24 above a maximum allowable change, which is an indication of the skid condition, to produce the skid control signal on the line 32.

Also supplying hydraulic fluid under pressure to the skid control valve 10 is a cycling pump 36 coupled to a port of the valve 10 by means of a conduit 38. Fluid delivered from the valve 10 is discharged into a reservoir 40 through a conduit 42. The reservoir 40 supplies fluid to the cycling pump 36 over a conduit 44.

Figure 2:
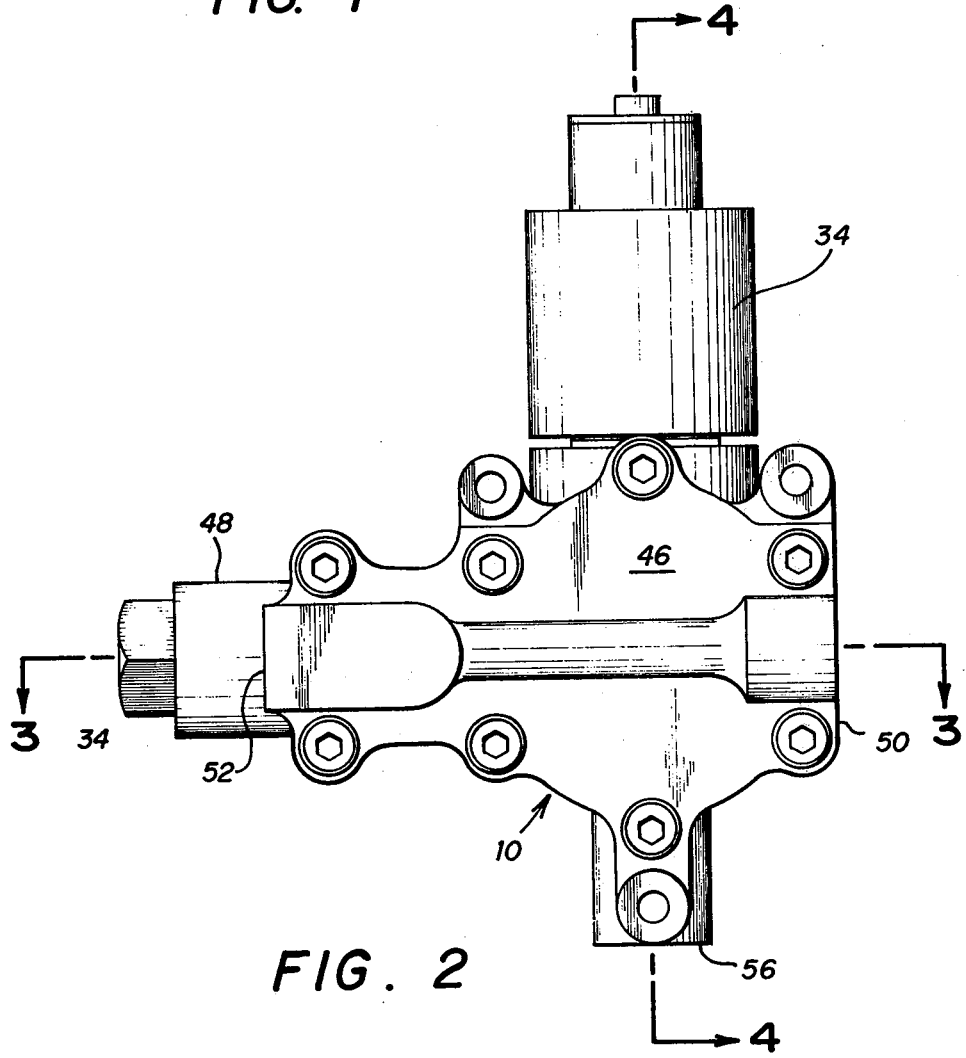
FIG. 2 is a front view of one embodiment of a skid control valve of the present invention.

Referring to FIG. 2, there is shown an external view of the skid control valve 10 including the solenoid 34 responsive to the skid control signal on the line 32. The valve 10 comprises a two section housing including a brake section 46 and a pump section 48 with the former including a brake port 50 and a master cylinder port 52. The brake port 50 receives a coupling of the conduit 20 and the master cylinder port 52 receives a coupling of the conduit 14. Formed within the pump section 48 is a pump port 54 and a return port 56 with the former receiving a coupling of the conduit 38 and the latter receiving a coupling of the conduit 42.

Figure 3:
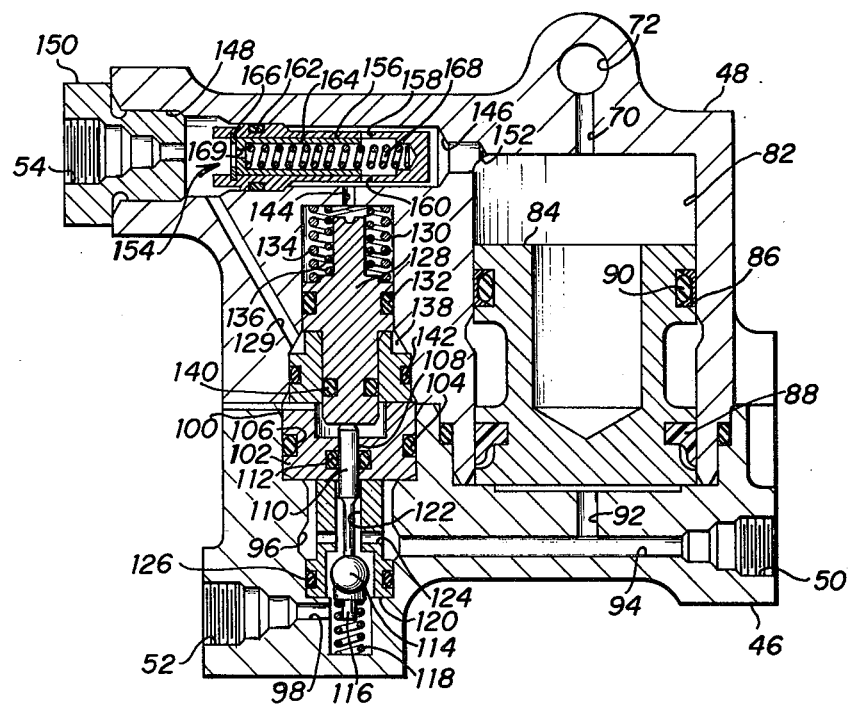
FIG. 3 is a cross-section of the valve of FIG. 2 taken along the line 3—3.
Figure 4:
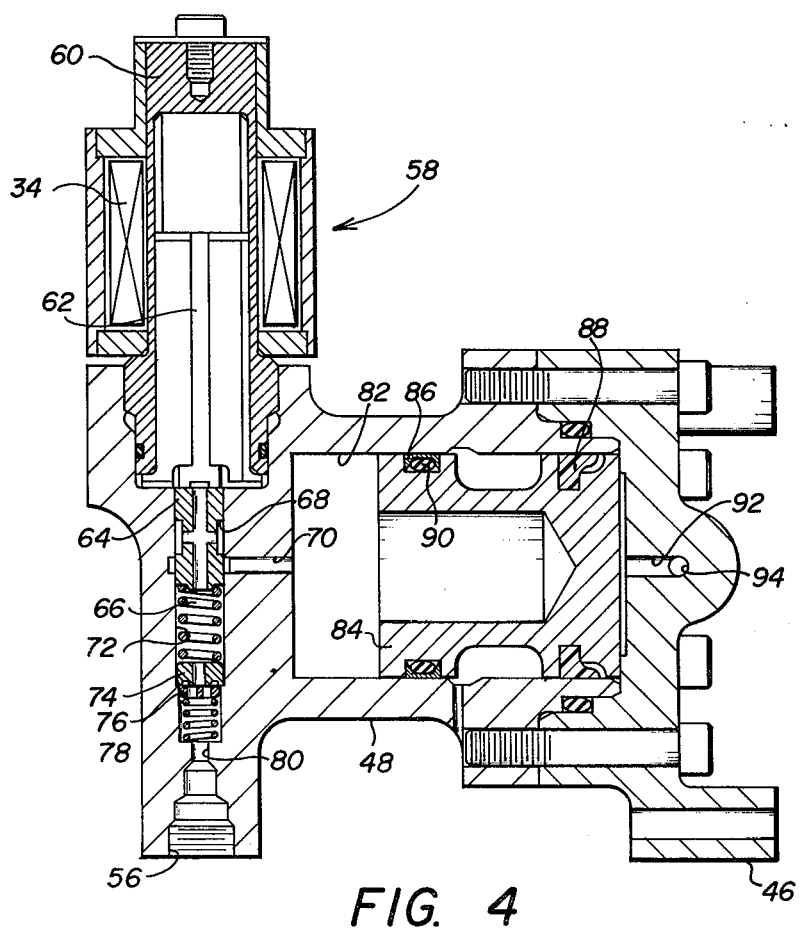
FIG. 4 is a cross-section of the valve of FIG. 2 through the solenoid actuator taken along the line 4—4.

Referring to FIGS. 3 and 4, the solenoid 34 is part of a solenoid assembly 58 mounted to the pump housing 48 by means of a solenoid housing 60. Energizing the solenoid 34 by means of the skid control signal on the line 32 causes a plunger 62 to move an oscillator, for example a slider valve 64 against the action of a spring 66 from a position as shown to a position where an opening 68 in the slider is aligned with a channel 70 of the section 48. With the slider 64 so positioned, the channel 70 is in communication with a secondary flow cavity 72 of the section 48.

Figure 4A:
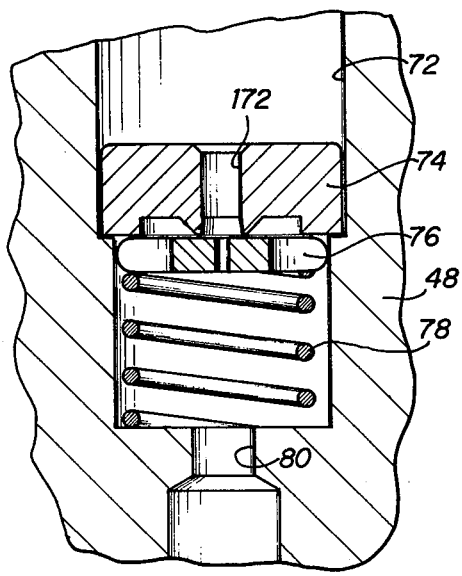
FIG. 4A is an expanded view of the section of FIG. 4 at a poppet valve as part of the solenoid actuated assembly.
Figure 4B:
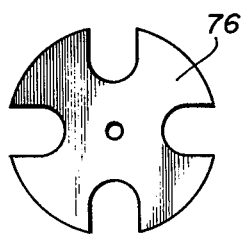
FIG. 4B is a plan view of the poppet valve of FIG. 4.

As more clearly shown in FIG. 4A, included within the cavity 72 is a poppet valve comprising a seat 74 and a poppet 76 biased into the position shown by means of a spring 78. The poppet 76 is shown in plan view in FIG. 4B.

Opening into one end of the cavity 72 is a channel 80 forming the innermost end of the return port 56.

In communication with the inboard end of the channel 70 is a changeover cavity, which in the present example is a cylinder 82 containing an actuator for example a piston 84 movable within the cylinder. Chambers formed on either end of the piston 84 are separated from each other by means of packing cups 86 and 88. The packing cup 86 is biased into sealing contact with the walls of the cylinder 82 by means of an O-ring 90. By means of the packings 86 and 88, fluid entering the chamber at the channel 70 end of the piston 84 is prevented from flowing into the chamber formed at the head end of the piston.

The chamber formed at the head end of the piston 84 communicates with a channel 92 that in turn terminates at a brake port channel 94. With reference to FIG. 3, the right end of the channel 94 terminates at the brake port 50. The left end of the passage 94 terminates in a primary flow cavity 96 that communicates by means of a channel 98 to the master cylinder port 52.

The cavity 96 opens into an enlarged cavity 100 both within the brake section 46. Assembled within the cavity 100 is a retainer 102 having an O-ring seal 104 in an annular groove 106. Bored through the retainer 102 along a longitudinal axis is a guideway 108 through which passes a stem 110 extending into the cavity 96. An O-ring 112 encircling the stem 110 provides a seal between the cavities 96 and 100.

At the lower end of the stem 110 there is a control or ball valve 114 in contact with a ball cap 116. The ball cap 116 is biased against the ball valve 114 by means of a spring 118. When in a closed position, the ball valve 114 seals off the channel 94 from the master cylinder port 52 by engaging a valve seat 120. The valve seat 120 includes a longitudinal passage 122 and a transverse passage 124 with the latter in communication with the cavity 96. An O-ring 126 provides a seal around the seat 120 and engages the inner wall of the cavity 96 to divide the cavity into an upper region communicating with the channel 94 and a lower region communicating with the channel 98.

In contact with the upper end of the stem 110 is a primary controllers including a piston 128 within a cavity 130 formed in the pump section 48. An O-ring 132 in an annular groove encircling the piston 128 cooperates with the piston to divide the cavity into an upper chamber and a lower chamber. The piston 128 is biased into the position shown by means of springs 134 and 136 in contact with the piston and engaging the upper end of the cavity 130. At the lower end of the cavity 130 the walls flare into a larger diameter section and assembled within this lower section is a retainer 138 that includes a longitudinal channel to provide a bearing guide for the piston 128. An O-ring 140 in an annular groove of the piston 128 provides a seal between the cavity 130 and the cavity 110. An O-ring 142 in an annular groove in the retainer 138 also provides a seal between the cavity 130 and the cavity 100.

In communication with the upper end of the cavity 130 is a channel 144 that terminates in a cavity 146 formed in the pump section 48. The left end of the cavity 146 flares into a larger diameter section that terminates at an internally threaded fitting 148 for receiving a fitting adapter 150 containing the pump port 54. At the right end of the cavity 146 there is a channel 152 opening into the cylinder 82.

The cavity 146 contains a flow control assembly 154 that includes a retainer 156 having transverse passage 158 and 160 to provide communication between an internal cylinder of the retainer 156 and the cavity 146. An O-ring seal 162 in an annular groove of the retainer 156 provides a fluid seal between the left and right portions of the cavity 146.

Slidably mounted within the retainer 156 is a piston 164 retained in place by a retainer ring 166 and biased into the position illustrated by means of a spring 168.

In operation of the skid control valve 10 in the system of FIG. 1, the cycling pump 36 provides pressurized fluid through the port 54 into the cylinder within the retainer 156 through a channel 169 to the head of the piston 164. Fluid provided by the pump 36 into the cylinder of the retainer 156 passes through the transverse passages 158 and 160 into the cavity 130 and into the cylinder 82. Fluid pressure developed in the cylinder 82 forces the piston 84 into the position shown in FIGS. 3 and 4. With the solenoid 34 deenergized, fluid in the cylinder 82 is blocked at the channel 70 by means of the slider 64. A fluid pressure developed in the cavity 130 exerts a downward force against the piston 128 is addition to the force provided by the springs 134 and 136.

During normal operation of the brake system, pressurized fluid provided by the master cylinder 12 enters the port 52 around the ball valve 114 and through the channel 94 to the brake port 50. From the brake port 50, the pressurized fluid flows through the conduit 20 to the individual wheel brake actuators. This normal braking function continues so long as the brake controllers 30 and 30a do not detect a velocity change in excess of a maximum allowable change from the outputs of the sensors 26 and 28 to generate a skid control signal on the line 32. Thus, an operator of the vehicle selectively energizes the brakes of the wheels 22 and 24 as desired.

Figure 6:
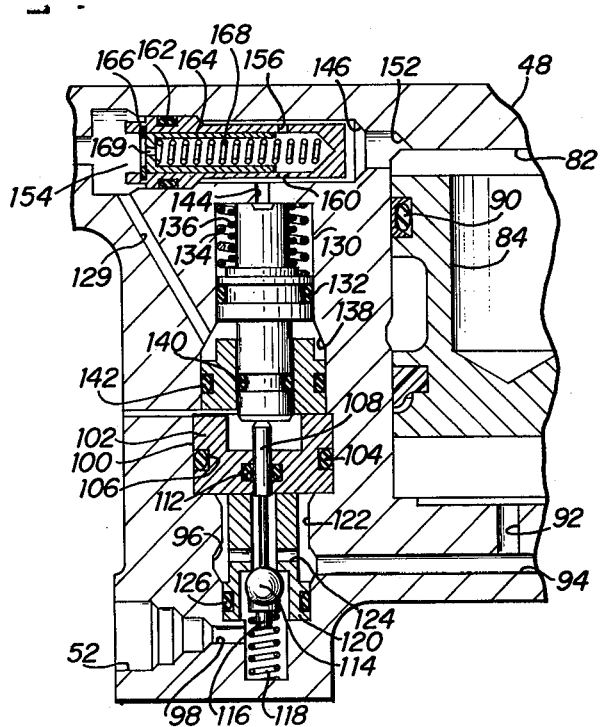
FIG. 6 is a flow schematic showing the skid control valve in a skid control condition.
Figure 5:
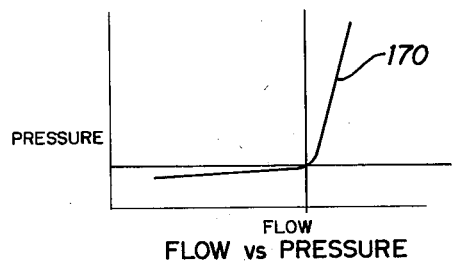
FIG. 5 is a graph of flow versus pressure for the poppet valve of FIG. 4.

Referring to FIG. 6, considering now the operation of the system when an operator is applying a force on the pedal 18 to develop a fluid pressure at the brake actuators of the wheels 22 and 24 and the brake controllers 30 or 30a respond to the sensors 26 and 28, respectively, to generate a skid control signal on the line 32. This signal energizes the solenoid 34 to actuate the plunger 62 to move the slider 64 against the spring 66 into a position such that the port 68 is aligned with the passage 70. This allows fluid in the cylinder 82 to flow through the seat 74 and around the poppet 76 into the reservoir 40. Pressure in the cylinder 82 decreases as shown by the curve of FIG. 5 of flow versus pressure. After the pressure in the cylinder 82 reaches the knee of the curve 170, the poppet 76 closes against the seat 74 and the flow from the cylinder 82 is now controlled by the passage of the poppet 76.

Fluid flowing through the seat 172 returns to the reservoir 40 and causes pressure within the cylinder 82 and the cavities 130 and 146 to decrease rapidly from the level established by the cycling pump 36. As pressure within the cavity 146 decreases a similar decrease in pressure will occur within the cylinder of the retainer 156 and a pressure exerted on the piston 164 will cause movement of the piston to block off the passages 158 and 160 thereby preventing additional fluid from entering the cavity 146.

As pressure within the cylinder 82 decreases to below that established by the master cylinder 12 in the channel 94, pressure on the piston head produces a force greater than that on the channel 70 end of the cylinder 82 thereby allowing the piston to move from the position illustrated to the opposite extent of travel. Movement of the piston 84 significantly increases the volume of the chamber at the piston head causing an immediate decrease in applied pressure to the brake actuators of the wheels 22 and 24. This release of fluid pressure at the wheels 22 and 24 interrupts the braking action as previously developed by operation of the master cylinder 12.

Simultaneously with the above action, pressure at the port 54 is transferred to the stem 110 side of the piston 128 through the channel 129. As shown in FIG. 6, this causes the piston 128 to move against the forces developed by the springs 134 and 136 and the stem 110 follows the piston to allow the ball valve 114 to move. Opening the channel 70 to the reservoir 40 produces a reduction of pressure within the cavity 130, as previously explained, so that only a minimum force acts on the piston 128. Movement of the ball valve 114 eventually forces it against the seat 120 to close off the fluid flow path from the master cylinder 12 to the brake actuators of the wheels 22 and 24. This action of the ball valve 114 maintains pressure within the master cylinder 12 at the level previously established by an operator actuating the brake pedal 18.

The solenoid 34 is cycled off by the brake controller 30 allowing the slider 64 to move into the position illustrated by means of the spring 66. Pressure developing within the cylinder of the retainer 156 forces the piston 164 against the retaining ring 166 and fluid is again allowed to flow into the cavities 130 and 146 and the cylinder 82. As pressure builds up within the cylinder 82 the piston 84 is again forced into the position illustrated in FIGS. 3 and 4 reducing the volume of the chamber at the piston head and increasing pressure in the channel 94. This increasing pressure in the channel 94 is communicated through the conduit 20 to the brake actuators of the wheels 22 and 24, and the brakes are again applied.

At the same time, pressure within the cavity 130 drives the piston 128 downward against the stem 110 to force the ball valve 114 away from the seat 120. This again establishes a flow path between the master cylinder 12 and the brake actuators of the wheels 22 and 24. Normal braking action has been resumed.

Assuming a skid condition still exists, the solenoid 34 is again energized to repeat the action of dumping fluid from the cavities 130 and 146 and the cylinder 82 into the reservoir 40 to again reduce pressure applied to the brake actuators of the wheels 22 and 24. This cyclic application of fluid pressure to the brake actuators of the wheels 22 and 24 continues so long as a skid condition is detected by the brake controller 30 and an operator is applying a force to the brake pedal 18.

Releasing the brake pedal 18 during a skid condition reduces pressure applied against the ball valve 114 and the higher pressure in the cavity 96 forces the ball check valve 114 to open thereby allowing pressure applied to the brake actuator to be reduced to the valve at the port 52. Cycling the operation of the solenoid 34 under this condition allows only a pressure to the brake actuators of the wheels 22 and 24 as developed at the port 52. Thus, the operator can interrupt the cyclic operation of the application of brake pressure by releasing the brake pedal 18.

Figure 7:
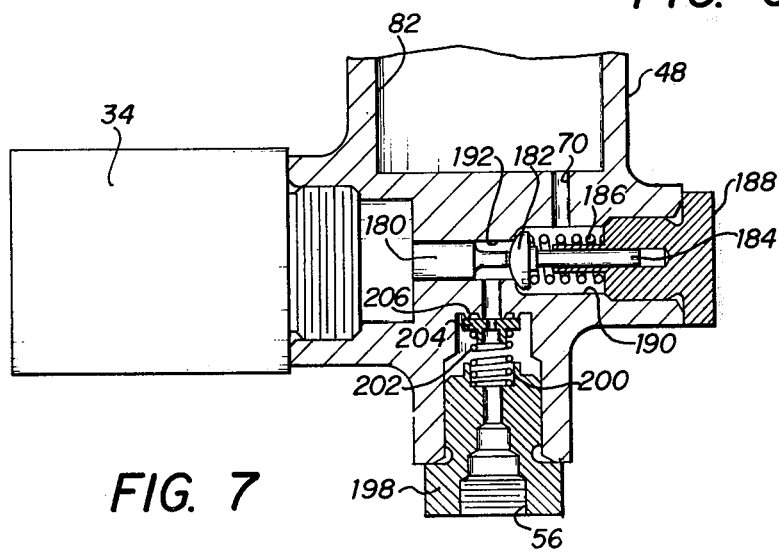
FIG. 7 is a partial view in section of a modification of the solenoid actuated valve of FIG. 4.

Referring to FIG. 7, there is shown an alternate embodiment of the solenoid control valve assembly for controlling fluid from the cylinder 82 into the reservoir 40. The solenoid 34, mounted to the pump section 48, controls a plunger 180 in contact with a valve 182. The valve 182 is mounted to a stem 184 and biased into the position shown by means of a spring 186. The stem 184 slides within a retainer 188 threaded into an opening of the pump section 48. When in a closed position as shown, the valve 182 restricted fluid flow from the cylinder 82 through the channel 70 that opens into a cavity 190.

Extending from the cavity 190 is a cavity 192 with a channel 194 opening therein above the valve 182. The channel 194 communicates with a cavity 196 that is capped with an adapter 198 that includes the return port 56. The inboard end of the adapter 198 includes a cylindrical well 200 in which is mounted a spring 202 biasing a poppet 204 against a seat 206 as part of the pump housing 48.

Operationally, the embodiment of FIG. 7 is similar to that of the embodiment of FIGS. 2–4. Energizing the solenoid moves the valve 182 from a closed position to allow fluid within the cylinder 82 to pass through the channel 70, the cavity 190, the channel 194 and past the poppet 204 through the return port 56 to the reservoir 40. The same cyclic application of pressure to the brake actuators of the wheels 22 and 24 is developed by the embodiment of FIG. 7.

While several embodiments of the invention, together with modifications thereof, have been described in detail herein and shown in the accompanying drawings, it will be evident that various further modifications are possible without departing from the scope of the invention.

What is claimed is:

1. A hydraulic valve for coupling to a primary fluid source and a secondary fluid source, comprising in combination:
   a housing including a changeover cavity;
   a pressure responsive actuator means in the changeover cavity separating primary and secondary portions thereof;
   means defining a primary flow cavity, said primary flow cavity having an input channel and an output channel, said primary portion of said changeover cavity being connected to said primary output channel, said primary input channel being arranged for connection to the primary fluid source;
   means defining a secondary flow cavity, said secondary flow cavity having an input channel and a return channel, said secondary input channel being connected to said secondary portion of said changeover cavity, said secondary return channel being arranged for connection to the secondary fluid source;
   an oscillator valve in said secondary flow cavity for alternately connecting and disconnecting said secondary portion of said changeover cavity to said secondary return channel;
   control means connecting said secondary fluid source with said secondary portion of said changeover cavity, said control means being responsive to the pressure within said secondary portion of said changeover cavity for controlling the flow of said secondary fluid thereto, said pressure responsive actuator being movable within said changeover cavity to vary the respective volumes of said primary and secondary portions in responsive to the secondary fluid pressure bearing thereon; and
   a control valve in the primary flow cavity for controlling the flow of fluid from the primary fluid source to the output channel.

2. A hydraulic valve as set forth in claim 1 wherein said actuator comprises a piston mounted in the changeover cavity, said primary control valve being operatively coupled to said control means, said control valve being responsive to both said primary output channel pressure and said control means in controlling the flow of fluid from the primary fluid source to said primary output channel.

3. A hydraulic valve as set forth in claim 1 wherein said actuator means further includes means defining an air gap between said primary and secondary fluids, said hydraulic valve further including means defining an air vent leading from said air gap to venting primary and secondary fluid leadage from the air gap.

4. A hydraulic valve as set forth in claim 1 including a solenoid connected to said oscillator valve to control the operation thereof.

5. A hydraulic valve as set forth in claim 1 including a poppet valve in the secondary cavity to control the flow of fluid to the secondary source.

6. A hydraulic valve for coupling a primary fluid source to an output conduit and a secondary fluid system including a secondary source and a secondary reservoir, comprising in combination:
   a housing including a changeover cavity, a first end of said changeover cavity being in communication with the secondary source, the opposite end of said changeover cavity being in communication with the output conduit;
   an actuator means within said changeover cavity separating said first end from said opposite end and movable therein between first and second positions;
   a control valve for controlling the flow of fluid from the primary source to the output conduit in response to the movement of said actuator means; and
   an oscillating valve for alternately connecting and disconnecting the first end of said changeover cavity to the secondary reservoir, said actuator means including means defining an air gap therein, said hydraulic valve further including means defining an air vent leading from said air gap for venting primary and secondary fluid leakage from said air gap.

7. A hydraulic valve for coupling to a primary fluid source and a secondary fluid source, comprising in combination:
   a housing including a changeover cavity;
   a pressure responsive actuator means in the changeover cavity separating primary and secondary portions thereof;
   means defining a primary flow cavity, said primary flow cavity having an input channel and an output channel, said primary portion of said changeover cavity being connected to said primary output channel, said primary input channel being arranged for connection to the primary fluid source;
   means defining a secondary flow cavity, said secondary flow cavity having an input channel and a return channel, said secondary input channel being connected to said secondary portion of said changeover cavity, said secondary return channel being arranged for connection to the secondary fluid source;
   an oscillator valve in said secondary flow cavity for alternately connecting and disconnecting said secondary portion of said changeover cavity to said secondary return channel;
   control means connecting said secondary fluid source with said secondary portion of said changeover cavity, said control means being responsive to the pressure within said secondary portion of said changeover cavity for controlling the flow of said secondary fluid thereto, said pressure responsive actuator being movable within said changeover cavity to vary the respective volumes of said primary and secondary portions in response to the secondary fluid pressure bearing thereon, said control means including a blocking valve to entrap fluid therein; and
   a control valve in the primary flow cavity for controlling the flow of fluid from the primary source to the output channel.

8. A hydraulic valve as set forth in claim 7 wherein said control valve includes a ball valve connected between the primary fluid source and the output channel and biased to establish a flow between the latter and the fluid source.

9. A hydraulic valve as set forth in claim 7 wherein said actuator comprises a piston mounted in the changeover cavity.

10. A hydraulic valve as set forth in claim 7 wherein said changeover cavity comprises a cylinder and said actuator comprises a piston movable in the cylinder in response to fluid from the secondary source.

11. In a hydraulic control system including a primary fluid source and a secondary fluid source, the combination comprising:
- means responsive to a controlled condition for generating a signal related to a departure of the condition from an established level;
- circuit means responsive to the signal from said means for generating an output control signal;
- a hydraulic valve, comprising:
  - a. a housing including a changeover cavity;
  - b. a pressure responsive actuator means in the changeover cavity separating primary and secondary portions thereof;
  - c. means defining a primary flow cavity, said primary flow cavity having an input channel and an output channel, said primary portion of said changeover cavity being connected to said primary output channel, said primary cavity input channel being arranged for connection to the primary fluid source;
  - d. a control valve in the primary flow cavity for controlling the flow of fluid from the primary source to the primary cavity output channel;
  - e. means defining a secondary flow cavity, said secondary flow cavity having an input channel and a return channel, said secondary input channel being connected to said secondary portion of said changeover cavity, said secondary return channel being arranged for connection to the secondary fluid source;
  - f. an oscillator valve in said secondary flow cavity and responsive to the control signal for alternately connecting and disconnecting said secondary portion of said changeover cavity to said secondary cavity return channel; and
  - g. control means connecting said secondary fluid source with said secondary portion of said changeover cavity, said control means being responsive to the pressure within said secondary portion of said changeover cavity for controlling the flow of said secondary fluid thereto, said pressure responsive actuator being movable within said changeover cavity to vary the respective volumes of said primary and secondary portions in response to the secondary fluid pressure bearing thereon.

12. The combination as set forth in claim 11 wherein said circuit means generates a control signal to alternately energize and deenergize the oscillating valve.

13. The combination as set forth in claim 11 wherein said control valve includes a check valve connected between the primary fluid source and the primary cavity output channel and biased to establish a flow between the latter and the primary fluid source.

14. The combination as set forth in claim 11 wherein said control valve is responsive to said control means.

15. The combination as set forth in claim 14 including a solenoid connected to said oscillating valve and responsive to the control signal to control the operation of said oscillating valve.

16. In a hydraulic system including a primary fluid source and a secondary fluid source, the combination comprising:
- means responsive to a control condition for generating a signal related to a departure of the condition from an established level;
- circuit means responsive to the signal from said means for generating an output control signal;
- a hydraulic valve, comprising:
  - a. a housing including a changeover cavity;
  - b. a pressure responsive actuator means in the changeover cavity separating primary and secondary portions thereof;
  - c. means defining a primary flow cavity, said primary flow cavity having an input channel and an output channel, said primary portion of said changeover cavity being connected to said primary output channel, said primary cavity input channel being arranged for connection to the primary fluid source;
  - d. a control valve in the primary flow cavity for connecting the primary fluid source to the primary cavity output channel;
  - e. means defining a secondary flow cavity, said secondary flow cavity having an input channel and a return channel, said secondary input channel being connected to said secondary portion of said changeover cavity, said secondary return channel being arranged for connection to the secondary fluid source;
  - f. an oscillator valve in said secondary flow cavity and responsive to the control signal for alternately connecting and disconnecting said secondary portion of said changeover cavity to said secondary cavity return channel; and
  - g. control means connecting said secondary fluid source with said secondary portion of said changeover cavity, said control means including a blocking valve responsive to the pressure within said secondary portion of said changeover cavity for entrapping fluid therein thereby controlling the flow of said secondary fluid to the secondary portion of said changeover cavity, said pressure responsive actuator being movable within said changeover cavity to vary the respective volumes of said primary and secondary portions in response to the secondary fluid pressure bearing thereon.

17. The combination as set forth in claim 16 wherein the control valve includes a check valve connected between the primary fluid source and the primary cavity output channel and biased to establish a flow between the latter and the primary fluid source.

18. The combination as set forth in claim 17 wherein said actuator comprises a piston mounted in the changeover cavity.

19. The combination as set forth in claim 17 wherein said changeover cavity comprises a cylinder and said actuator comprises a piston movable in the cylinder in response to fluid from the secondary source.

20. In a hydraulic brake control system for a wheeled vehicle and including a primary fluid source and a secondary fluid source, the combination comprising:
- means responsive to a sensed skid condition of the vehicle to generate a signal indicating such a condition;
- circuit means responsive to the signal from said means for generating an output control signal;
- a hydraulic valve, comprising:
  - a. a housing including a changeover cavity;
  - b. a pressure responsive actuator means in the changeover cavity separating primary and secondary portions thereof;

c. means defining a primary flow cavity, said primary flow cavity having an input channel and an output channel, said primary portion of said changeover cavity being connected to said primary output channel, said primary cavity input channel being arranged for connection to the primary fluid source;

d. a control valve in the primary flow cavity for connecting the primary cavity output channel to the primary fluid source;

e. means defining a secondary flow cavity, said secondary flow cavity having an input channel and a return channel, said secondary input channel being connected to said secondary portion of said changeover cavity, said secondary return channel being arranged for connection to the secondary fluid source;

f. an oscillator valve in said secondary flow cavity and responsive to the control signal for alternately connecting and disconnecting said secondary portion of said changeover cavity to said secondary cavity return channel; and g. control means connecting said secondary fluid source with said secondary portion of said changeover cavity, said control means being responsive to the pressure within said secondary portion of said changeover cavity for controlling the flow of said secondary fluid thereto, said pressure responsive actuator being movable within said changeover cavity to vary the respective volumes of said primary and secondary portions in response to the secondary fluid pressure bearing thereon.

21. The combination as set forth in claim 20 wherein said control means includes a blocking valve to entrap fluid therein.

22. The combination as set forth in claim 21 wherein said control valve includes a check valve connected between the primary fluid source and the primary cavity output channel and biased to establish a flow between the latter and the primary fluid source.

* * * * *